United States Patent
Manso

(10) Patent No.: US 8,938,232 B2
(45) Date of Patent: Jan. 20, 2015

(54) METHOD AND SYSTEM FOR ALLOWING A USER OF A MOBILE TERMINAL TO BENEFICIATE SERVICES OF A FOREIGN MOBILE NETWORK AS A REGULAR SUBSCRIBER THEREOF

(75) Inventor: Laurent Manso, Saint Paul (FR)

(73) Assignee: IQSIM, Biot (FR)

( * ) Notice: Subject to any disclaimer, the term of this patent is extended or adjusted under 35 U.S.C. 154(b) by 0 days.

(21) Appl. No.: 13/301,028

(22) Filed: Nov. 21, 2011

(65) Prior Publication Data

US 2013/0130676 A1    May 23, 2013

(51) Int. Cl.
```
H04W 4/00      (2009.01)
H04W 8/18      (2009.01)
H04B 1/38      (2006.01)
H04W 8/06      (2009.01)
H04W 88/06     (2009.01)
```

(52) U.S. Cl.
CPC . *H04B 1/38* (2013.01); *H04W 8/06* (2013.01); *H04W 8/18* (2013.01); *H04W 88/06* (2013.01)
USPC .................... 455/432.1; 455/550.1; 455/552.1

(58) Field of Classification Search
CPC ......... G06F 21/35; H04B 1/38; H04W 88/06; H04W 8/06; H04W 8/18
USPC ................. 455/432.1, 432.3, 433, 434, 435.1, 455/435.2, 455, 550.1, 552.1, 553.1
See application file for complete search history.

(56) References Cited

U.S. PATENT DOCUMENTS

2010/0075711 A1*   3/2010   Tsubouchi et al. ........ 455/553.1
2011/0130118 A1*   6/2011   Fan et al. ...................... 455/411
2012/0142314 A1*   6/2012   Mohammed .................. 455/411

FOREIGN PATENT DOCUMENTS

EP           1 850 607 A2    10/2007

OTHER PUBLICATIONS

Supplemental European Search Report dated May 2, 2013, issued in corresponding European Patent Application No. 11 26 8027 (5 pages).

* cited by examiner

*Primary Examiner* — Kathy Wang-Hurst
(74) *Attorney, Agent, or Firm* — Westerman, Hattori, Daniels & Adrian, LLP

(57) ABSTRACT

A method and system to beneficiate, via a mobile terminal, services provided by a foreign locally accessible mobile network as a regular subscriber, by providing an apparatus with first and second modems and a subscriber identity module; providing a remote server containing a plurality of subscriber identity modules; allowing the apparatus to register with a foreign locally accessible mobile network using the first modem and the attached subscriber identity module, and to establish a data connection between the apparatus and the remote server; via the data connection, providing the remote server with information allowing it to determine which subscriber identity module is allowing local benefit of the services provided by a foreign locally accessible mobile network, and selecting that module; assigning the selected module to the second modem; allowing the apparatus to register with the foreign locally accessible network using the second modem and the selected module.

20 Claims, 2 Drawing Sheets

METHOD AND SYSTEM FOR ALLOWING A USER OF A MOBILE TERMINAL TO BENEFICIATE SERVICES OF A FOREIGN MOBILE NETWORK AS A REGULAR SUBSCRIBER THEREOF

FIELD OF THE INVENTION

The invention relates to a method and a system for allowing a user of a mobile terminal to beneficiate services provided by a foreign locally accessible mobile network as a regular subscriber of said network. The method according to the invention constitutes a method which is alternate to roaming.

BACKGROUND OF THE INVENTION

The mobile networks according to the invention are Public Land Mobile Networks (PLMNs) that are designed, for example, according to the Global System for Mobile Communications (GSM) standard or according to technologies that inherited from this standard and, in particular, third generation (3G) and Long Term Evolution (LTE) standards.

These mobile networks offer various telephony services including full compatibility with the public switched telephone network and SMS (short messages services). Generally, they offer the capability for mobile terminals to access web sites, download data from the web, beneficiate MMS (Multimedia Message Services) and e-mail services.

A key concept in the architecture of PLMNs is the cell. Indeed, the PLMNs are composed of contiguous geographical areas called cells. For each cell of a PLMN, there is a base station transceiver. This base station is called BTS according to the GSM standard. It is called NodeB or eNodeB according to the 3G or LTE standards, respectively. The base stations communicate with all mobile terminals within a cell. The cell is finally the access point to the network for mobile terminals within its coverage.

Practically, a base station continuously requests identification and authentication from terminals that attempt to use its resource. These are terminals that belong to the same PLMN as the base or not. If the base station recognises a mobile terminal that belongs to the operator's network, the mobile terminal is then allowed to register with the network, using the base station as an access point, and to use the network's communication services as allowed by agreement with the user.

The mobile equipment generally contains a module, which is named, for example, subscriber identification module (SIM). This module is generally a smart card which is inserted in the mobile equipment. The identification data comprise a unique number, which is the international mobile subscriber identifier (IMSI). It also comprises a unique authentication key (Ki), which is associated with the IMSI. The IMSI is made up of three numbers: a country number, a number identifying the PLMN in its country and a number identifying the subscriber by the operator. The Ki is a 128-bit value.

For example, according to the GSM standard, for initial registration of a mobile terminal, the network obtains the IMSI from the SIM of the mobile terminal, and passes this to the mobile operator requesting access and authentication. The operator network searches its database for the incoming IMSI and its associated $K_i$. It then generates a random number and signs it with $K_i$ associated with the IMSI, computing another number known as the signed response 1 (SRES_1). The operator network then sends the random number to the mobile terminal, which passes it to the SIM. The SIM signs it with its own $K_i$, producing a signed response 2 (SRES_2), which it gives to the mobile terminal along with an encryption key $K_c$. The mobile terminal passes SRES_2 on to the operator network. The operator network then compares the computed response SRES_1 with the computed response SRES_2 that the mobile terminal returned. If the two numbers match, the SIM is authenticated and the mobile terminal is granted access to the operator's network. $K_c$ is then used to encrypt all further communications between the mobile terminal and the network. Practically, the network may require the mobile terminal to authenticate every time an event is initiated, every so many events, or even after a certain time period has elapsed. Thus, the SIM is to be inserted in the mobile terminal for authentication all along time. Of course, other authentication methods do exist for standards other than the GSM.

A PLMN operates within an area defined as the territory of competency. Its coverage is limited by the borders of a territory, for example national borders. Outside these borders, a user, who wishes to beneficiate services provided by a foreign locally accessible network and who is not a subscriber of said network, can still access communication and other services that are offered by the foreign locally accessible mobile network, if the local network operator concluded a roaming agreement with the user's own operator. According to such a roaming agreement, the user pays for what he has consumed plus what is called 'roaming fees' corresponding to costs of delivering this service. This might result in high communication costs for the user.

SUMMARY OF THE INVENTION

The invention essentially provides a means for a user having a mobile terminal and being away from the coverage of its own PLMN to access communication services from a foreign PLMN as a regular subscriber thereof, thus benefiting from reduced communication costs as compared to 'roaming fees'.

To this aim, in accordance with a first aspect, the invention concerns a method for allowing a user of a mobile terminal to beneficiate services provided by a foreign locally accessible mobile network as a regular subscriber of said network, comprising the steps of:

providing an apparatus, said apparatus comprising a first modem, a second modem and a subscriber identity module, the first and second modems being cellular modems, the subscriber identity module comprised in the apparatus being attached to said first modem;

providing a remote server, said remote server containing a plurality of subscriber identity modules;

allowing the apparatus to register with a foreign locally accessible mobile network using the first modem and the subscriber identity module attached to said first modem, and to establish a data connection between the apparatus and the remote server;

in using said data connection, providing the remote server with an information allowing said remote server to determine which subscriber identity module, among the subscriber identity modules it contains, is allowing local benefit of the services provided by a foreign locally accessible mobile network, and selecting, within the plurality of subscriber identity modules, said subscriber identity module;

assigning the selected subscriber identity module to the second modem;

allowing the apparatus to register with said foreign locally accessible network using the second modem and the selected subscriber identity module; and allowing the user of the mobile terminal to beneficiate services provided by said foreign locally accessible network.

In accordance with a second aspect, the invention concerns a system for allowing a user of a mobile terminal to beneficiates services provided by a foreign locally accessible mobile network as a regular subscriber of said network, comprising:

an apparatus, said apparatus comprising a first modem, a second modem and a subscriber identity module, the first and second modems being cellular modems, the subscriber identity module being attached to said first modem;

a remote server, said remote server containing a plurality of subscriber identity modules; and a mobile terminal, said mobile terminal being connected to the apparatus wherein the apparatus register with a foreign locally accessible mobile network using the first modem and the subscriber identity module attached to said modem, establishes a data connection with the server, and wherein the server determine, selects a subscriber identity module it contains and assigns said module to the second modem for registration with a foreign locally accessible network and allowing the user of the mobile terminal to beneficiate services provided by said network.

BRIEF DESCRIPTION OF THE DRAWINGS

Other features and aspects of the present invention will be apparent from the following description and the accompanying drawings, in which.

DETAILED DESCRIPTION OF THE INVENTION

Figure 1:
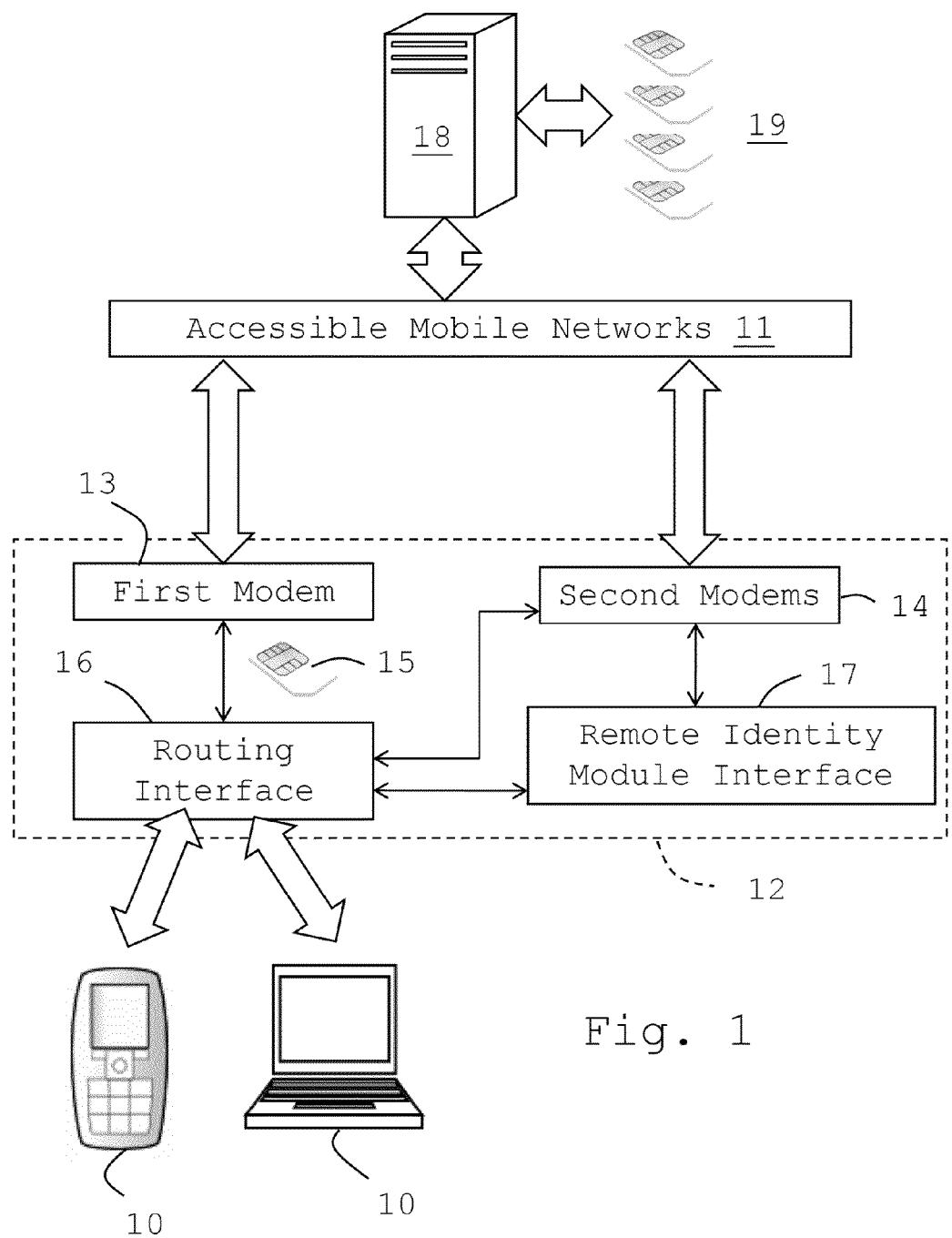
FIG. 1 shows a system according an embodiment of the invention.

The invention concerns a method and a system for enabling users of mobile terminals 10 as shown in FIG. 1, to beneficiate services provided by a foreign locally accessible mobile network 11, as regular subscribers of said network, without roaming.

The mobile terminals 10 are mobile devices, for example, mobile phones, smart phones, touch tablets, or personal computers, that may comprise a subscriber identification module or not.

The foreign locally accessible mobile network 11 is a PLMN. PLMNs according to the invention are cellular networks. It is for example a GSM network or a cellular network defined in standard others than the GSM standard for example a 3G, CDMA or LTE network. In this network, an operator provides mobile telephony services to subscribers, or other services and, in particular, short message services or access to the Internet, or transfer of digital data, for example using electronic messaging.

The system according to the invention comprises an apparatus 12.

The apparatus 12 comprises a first modem 13 and one or more second modems 14. The first is a cellular modem. The one or more second modems are cellular modems as well.

The apparatus 12 comprises a subscriber identity module 15. This module 15 is provided by an operator, which is generally not the foreign operator granting access to services within the foreign locally accessible mobile network. The module 15 is usually a smart card. However, it may be another physical of software means dedicated to identification of a subscriber. The module 15 is attached to the first modem 13. It means that the module 15 is inserted into a slot that is electrically connected to the first modem 13. Hence, the module 15 may send data in the network using said first modem 13 or receive data from this network through this modem 13.

The apparatus 12 further comprises a routing interface 16 for communication with the mobile terminals 10 that are hence connected with the apparatus 12. For example, this interface 16 is a physical interface such as a USB(™) (Universal Serial Bus), Card Express(™) or wired local network interface. In another example, this interface 16 is a wireless interface such as a WiFi(™) or a Bluetooth(™) interface.

The apparatus 12 also comprises a remote identity module interface 17. The remote identity interface 17 is electrically connected to the second modem 14 and to the routing interface 16. If the apparatus 12 comprises a plurality of second modems 17, then the remote identity interface 17 is connected to each of said second modems 14.

Finally, the apparatus 12 may comprise a battery and/or a power supply, as well as a chip for positioning the apparatus, for example, a Global Positioning Chip, which are not shown in FIG. 1.

The system according to the invention further comprises a remote server 18. This remote server 18 contains a plurality of subscriber identity modules 19. In an embodiment according to the invention, it contains more than 10 modules, for instance 20 modules. These modules are modules that belong to various operators of various PLMNs and that permit to register with the various mobile networks of these operators in the world. The server 18 is not necessarily located in the same place than the user. Generally, it is located in a country which is not the country where is located the user.

Figure 2:
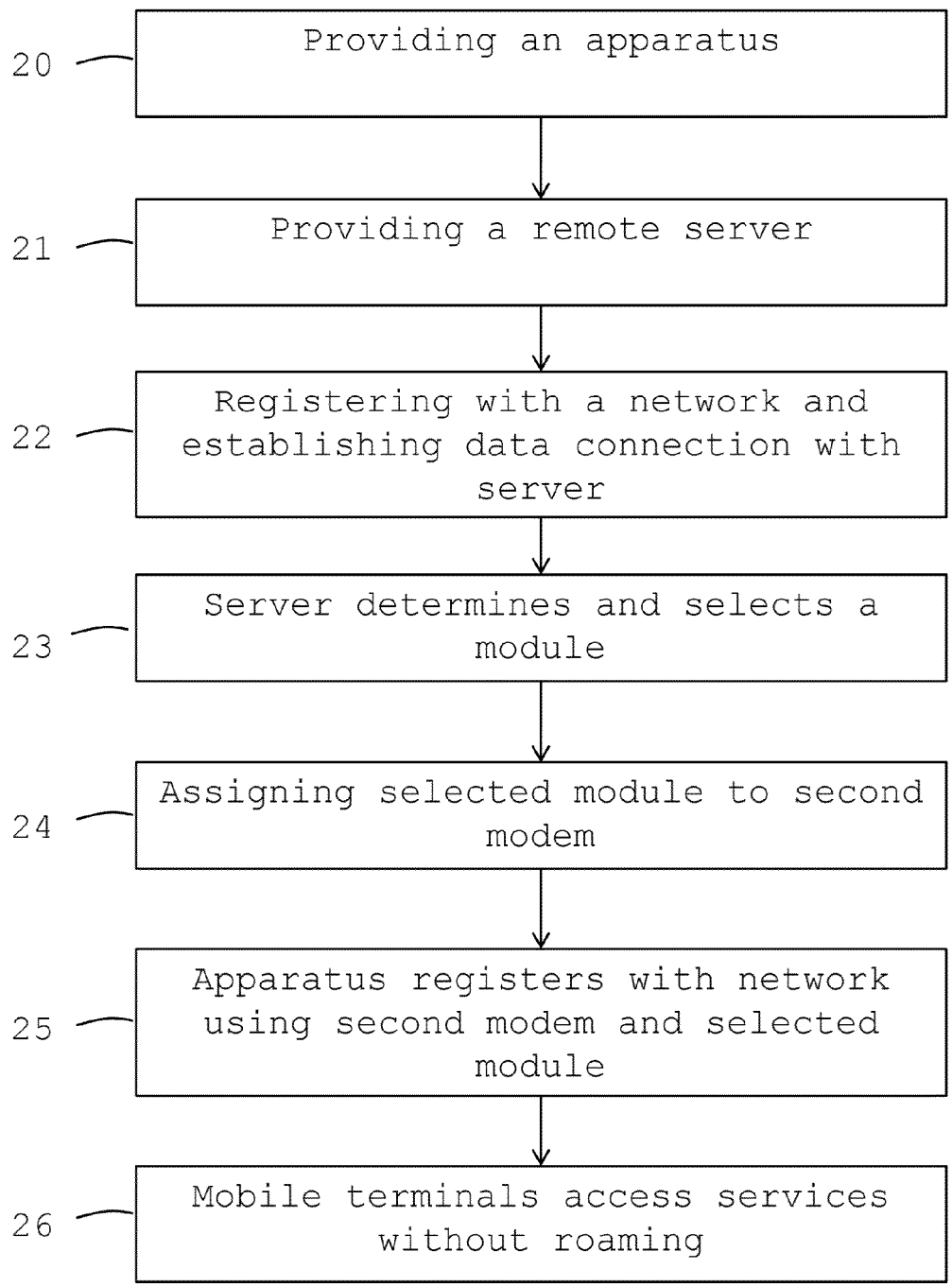
FIG. 2 shows various steps of the method according to the invention.

The method according to the invention comprises various steps, which are shown in FIG. 2.

According to a first and a second steps 20, 21, the apparatus 12 and the remote server 18 are provided.

According to further steps 22, the apparatus 12 is allowed to register with the or one of the foreign locally accessible mobile networks 11 using the first modem 13 and the subscriber identity module 15 attached to said first modem 13. As a result of the registration of the apparatus 12 with the foreign locally accessible mobile network 11, a data connection or data link is then established between the apparatus 12 and the remote server 18. This is a preliminary connection. This preliminary connection may necessitate roaming for creating the data link with the remote server 18.

If access to the Internet, for example through a WiFi(™) connection or by other means is available, the apparatus 12 may connect the server 18 via the Internet instead of using the first modem 13.

According to other steps 23, in using the data connection with the remote server 18, the apparatus 12 provide the server 18 with some information. This information is allowing the server 18 to determine which subscriber identity module, among the subscriber identity modules 19 it contains, is registered for local benefit of the services provided by one of the foreign locally accessible mobile networks 11. This information may comprise the identity of the registered network, the identity of all or some accessible networks, the serial number of the apparatus 12, and its location. The location of the apparatus 12 may comprise GPS coordinates provided by the GPS internal chip of the apparatus 12. While connected to the server 18, said server may request additional information to the apparatus 12 about available networks and/or the modems 14 comprises in the apparatus 12. In such case, the apparatus 12 replies to the server 18 in providing the requested information.

On the basis of the provided information, the remote server 18 selects at least one accurate locally accessible mobile network 11 and one subscriber identity module among the modules 19 it stores, that will allow a mobile terminal 10 to access services in said locally accessible network. The selected locally accessible network is advantageously the most appropriate network for the user's usage.

To that effect, according to step 24, the selected subscriber module is assigned to one of the second modems 14.

If there are a plurality of second modems 14, a module may be assigned to each of the second modems in the apparatus. The apparatus 12 will use each modem 14 in accordance with the configuration it receives from the server 18 using one of the following modes: data or voice/SMS/MMS.

The second modem 14 is then turned on and the apparatus 12 is allowed to register with the foreign locally accessible network using the second modem 14 and the selected subscriber identity module contained in the remote server 18 assigned to this modem.

For example, in the particular case where the network 11 is a GSM network, the registration process is as follows: the network requests the IMSI from the selected SIM 19 in the server 18. This IMSI is provided by the server 18 to the apparatus 12 and then passed to the mobile operator of the network 11 requesting access and authentication. The network operator searches its database for the incoming IMSI and its associated It should find these, as the SIM has been selected, due to the fact that it belongs to the foreign operator. The network then generates a random number and signs it with $K_i$ associated with the IMSI, computing another number known as the signed response 1 (SRES_1). The operator network then sends the random number to the apparatus, which passes it to the server 18 and to the selected SIM. The SIM signs it with its own $K_i$, producing a signed response 2 (SRES_2), which it gives to the apparatus 12 along with an encryption key $K_c$. The apparatus passes SRES_2 on to the network 11. The network then compares the computed response SRES_1 with the computed response SRES_2 that the apparatus 12 returned. If the two numbers match, the SIM is authenticated and the apparatus 12, and therefore the mobile terminal 10, is granted access to the network services. $K_c$ is used to encrypt all further communications between the apparatus 12 and the network 11. Generally, the network requires the apparatus 12 to authenticate every time an event is initiated, every so many events, or even after a certain time period has elapsed. Thus, the apparatus 12 should be in connection with the server 18 for authentication all along time.

Upon registration, the corresponding service, data or voice/SMS is available to the apparatus. Data channels are advantageously bundled in order to aggregate the bandwidth available and to provide single data channel. Thus the mobiles terminals are accessing services without roaming as shown in step 26.

On apparatus 12, the connection to the server 18 is maintained as far as possible in order to maintain the modules 19 connected to the second modems 14. Once a secondary data connection is established through the second modems, the apparatus 12 may stop using the first modem for connecting the server 18, and turn it off. The secondary data connection is then used to maintain the connection with the server 18 and maintain the subscriber identity module attached to the second modem or any other modem.

The invention claimed is:

1. A method for allowing a user of a mobile terminal to beneficiate services provided by a foreign locally accessible mobile network as a regular subscriber of said network, comprising the steps of:
    providing an apparatus, said apparatus comprising a first modem, a second modem different from the first modem, and a first subscriber identity module, the first and second modems being cellular modems, the first subscriber identity module comprised in the apparatus being attached to said first modem;
    registering the apparatus with a first foreign locally accessible mobile network using the first modem and the first subscriber identity module attached to said first modem;
    establishing a data connection between the apparatus and a remote server containing a plurality of subscriber identity modules;
    in using said data connection, providing the remote server with an information allowing said remote server to determine a second subscriber identity module, among the subscriber identity modules contained in the remote server, wherein said second subscriber identity module is allowing local benefit of services provided by a second foreign locally accessible mobile network, to select, within the plurality of subscriber identity modules, said second subscriber identity module, and to assign the selected second subscriber identity module to the second modem;
    registering the apparatus with said second foreign locally accessible network using the second modem and the selected second subscriber identity module; and
    allowing the user of the mobile terminal to beneficiate services provided by said second foreign locally accessible network, wherein the mobile terminal is connected to the apparatus, and wherein the data connection to the remote server using the first modem is maintained.

2. The method of claim 1, wherein the mobile terminal is selected from the group comprising mobile phones, smart phones, touch tablets, and personal computers.

3. The method according to claim 1, wherein at least one of the first and second networks is a GSM, CDMA network, 3G or LTE network.

4. The method of claim 1, wherein the modules contained in the server are modules that belong to various operators of various mobile networks.

5. The method of claim 1, wherein the data connection to the remote server is achieved through the Internet.

6. The method of claim 1, wherein the information comprise the identity of the registered first network, the identity of all or some accessible networks, the serial number of the apparatus, and/or its location.

7. The method according to claim 6, wherein the information comprise the location of the apparatus and said location comprises GPS coordinates provided a GPS internal chip of the apparatus.

8. The method of claim 1, wherein the connection between the apparatus and the server is maintained so that the second subscriber identity module is connected to the second modem during use of services provided by said second foreign locally accessible network to said remote terminal.

9. A system for allowing a user of a mobile terminal to beneficiate services provided by a foreign locally accessible mobile network as a regular subscriber of said network, said system comprising:
    an apparatus, said apparatus comprising a first modem, a second modem different from the first modem, and a first subscriber identity module, the first and second modems being cellular modems, the first subscriber identity module being attached to said first modem;
    a remote server, said remote server containing a plurality of subscriber identity modules, said remote server being capable of determining, among the plurality of subscriber identity modules contained in the remote server, a second subscriber identity module allowing local benefit of services provided by a second foreign locally accessible mobile network; and a mobile terminal, said mobile terminal being connected to the apparatus, wherein the apparatus registers with a first foreign locally accessible mobile network using the first modem and the first subscriber identity module attached to said first modem, and establishes a data connection with the server, wherein the server determines and selects a second subscriber identity module among the plurality of subscriber identity modules contained in the remote server, wherein said second subscriber identity module is assigned to the second modem for registration with the second foreign locally accessible network, so as to allow the user of the mobile terminal to beneficiate services provided by said second foreign locally accessible network, and wherein the data connection to the remote server using the first modem is maintained.

10. The system of claim 9, wherein the mobile terminal is selected from the group comprising mobile phones, smart phones, touch tablets, and personal computers.

11. The system of claim 9, wherein at least one of the first and second networks is a GSM, CDMA network, 3G or LTE network.

12. The system of claim 9, wherein the modules contained in the server are modules that belong to various operators of various mobile networks.

13. The system of claim 9, wherein the data connection to the remote server is achieved through the Internet.

14. The system of claim 9, wherein the information comprise the identity of the registered first network, the identity of all or some accessible networks, the serial number of the apparatus, and/or its location.

15. The system of claim 14, wherein the information comprise the location of the apparatus and said location comprises GPS coordinates provided a GPS internal chip of the apparatus.

16. The system of claim 9, wherein the connection between the apparatus to the server is maintained so that the second subscriber identity module is connected to the second modem during use of services provided by said second foreign locally accessible network to said remote terminal.

17. A system for allowing a user of a mobile terminal to beneficiate services provided by a foreign locally accessible mobile network as a regular subscriber of said network, said system comprising:

a server, said server containing a plurality of subscriber identity modules, said remote server being capable of determining, among the plurality of subscriber identity modules contained in the remote server, a subscriber identity module allowing local benefit of services provided by one or several foreign locally accessible mobile networks; and a connection between the server and a first network among the one or several foreign locally accessible mobile network;

wherein the server establishes a data connection with a remote apparatus, said apparatus comprising a first modem, a second modem different from the first modem, and a first subscriber identity module, the first and second modems being cellular modems, the first subscriber identity module being attached to said first modem, a mobile terminal being connected to the apparatus, the apparatus being registered with the first foreign locally accessible mobile network using the first modem and the first subscriber identity module attached to said first modem, wherein the server determines and selects a second subscriber identity module among the plurality of subscriber identity modules contained in the remote server, said second subscriber identity module being assigned to the second modem for registration with the second foreign locally accessible network, so as to allow the user of the mobile terminal to beneficiate services provided by said second foreign locally accessible network, and wherein the data connection to the remote server using the first modem is maintained.

18. The method of claim 1, wherein the second network is the same as the first network.

19. The system of claim 9, wherein the second network is the same as the first network.

20. The system of claim 17, wherein the second network is the same as the first network.

\* \* \* \* \*